(12) United States Patent
Hooper et al.

(10) Patent No.: US 12,491,972 B2
(45) Date of Patent: Dec. 9, 2025

(54) CUSTOM TIMER FOR MARINE BASED ACTIVITY

(71) Applicant: Navico, Inc., Tulsa, OK (US)

(72) Inventors: Mathew J. Hooper, Auckland (NZ); Adam M. King, Warkworth (NZ)

(73) Assignee: NAVICO, INC., Tulsa, OK (US)

( * ) Notice: Subject to any disclaimer, the term of this patent is extended or adjusted under 35 U.S.C. 154(b) by 238 days.

(21) Appl. No.: 18/529,044

(22) Filed: Dec. 5, 2023

(65) Prior Publication Data

US 2025/0178702 A1  Jun. 5, 2025

(51) Int. Cl.
| | |
|---|---|
| G06F 17/00 | (2019.01) |
| B63B 49/00 | (2006.01) |
| B63B 79/15 | (2020.01) |
| B63B 79/40 | (2020.01) |

(52) U.S. Cl.
CPC .............. *B63B 49/00* (2013.01); *B63B 79/15* (2020.01); *B63B 79/40* (2020.01); *B63B 2213/02* (2013.01)

(58) Field of Classification Search
CPC ......... B63B 49/00; B63B 79/15; B63B 79/40; B63B 2213/02
USPC .......................................................... 701/21
See application file for complete search history.

(56) References Cited

U.S. PATENT DOCUMENTS

| | | | | |
|---|---|---|---|---|
| 9,442,636 | B2 * | 9/2016 | Butterworth | .......... G06F 3/0482 |
| 10,304,347 | B2 * | 5/2019 | Wilson | ...................... G09B 5/02 |
| 10,909,474 | B2 * | 2/2021 | Reimer | .............. G06Q 10/0637 |
| 11,756,280 | B2 * | 9/2023 | Fieldman | ................ G06T 19/20 |
| | | | | 345/419 |
| 2014/0013259 | A1 * | 1/2014 | Thomas | ................ G06F 3/0488 |
| | | | | 715/771 |
| 2014/0096088 | A1 * | 4/2014 | Lu | .......................... G06F 3/0481 |
| | | | | 715/853 |
| 2022/0345565 | A1 * | 10/2022 | Carrigan | ........... H04M 1/72412 |

(Continued)

FOREIGN PATENT DOCUMENTS

| | | | | | |
|---|---|---|---|---|---|
| CA | 2997965 | C | * | 4/2021 | .............. G16H 40/63 |
| CA | 3226777 | A1 | * | 1/2023 | ....... G01N 35/00722 |

(Continued)

OTHER PUBLICATIONS

Perfect Fishing Trip Equipment _ Marine Electronics Guide (Year: 2025).*

*Primary Examiner* — Ronnie M Mancho
(74) *Attorney, Agent, or Firm* — Nelson Mullins Riley & Scarborough LLP

(57) ABSTRACT

Example devices, systems and methods are provided for causing presentation of a timer on a screen of a marine electronic device for a watercraft. Some example systems include a user interface comprising the screen, a memory including computer executable instructions and a processor. The marine electronic device is configured to receive a user input defining one or more users and a total amount of time for a marine-based activity and determine a specified amount of time to be assigned to each of the one or more users. The marine electronic device is further configured to assign the specified amount of time to each of the one or more users, display an indication of the specified amount of time within the timer for each of the one or more users, and provide a notification when the specified amount of time of a current user from the one or more users ends.

20 Claims, 10 Drawing Sheets

(56) References Cited

U.S. PATENT DOCUMENTS

| | | | |
|---|---|---|---|
| 2023/0260416 A1* | 8/2023 | Wilson | G06F 3/0482 434/247 |
| 2024/0231590 A1* | 7/2024 | King | G06F 3/0482 |
| 2025/0068300 A1* | 2/2025 | Wohlstadter | G06F 3/0482 |
| 2025/0178702 A1* | 6/2025 | Hooper | B63B 49/00 |

FOREIGN PATENT DOCUMENTS

| | | | | |
|---|---|---|---|---|
| WO | WO-2022221062 A1 * | 10/2022 | | H04M 1/72463 |
| WO | WO-2023054905 A1 * | 4/2023 | | G06F 8/38 |

* cited by examiner

CUSTOM TIMER FOR MARINE BASED ACTIVITY

FIELD OF THE INVENTION

Embodiments of the present invention relate generally to marine electronic devices and, more particularly, to marine electronic devices, systems and associated methods having a customizable timer for use in marine based activities.

BACKGROUND OF THE INVENTION

Many water-based activities include multiple users and require the need for time management and watching a clock or setting multiple alarms and/or timers on individual devices. For example, commercial or personal fishing can include different anglers at the rod at different times. This activity requires the anglers having specific time slots in which they are responsible for the rod. Generally, the anglers are told that they have a time slot and it is up to them to remember the order of the anglers and the specific amount of time for each angler. This often creates confusion and chaos among the anglers.

In another example, in different watersports like wakeboarding, users generally have a specific amount of time on the water before they switch to the next user. The allocation of time can create confusion for the users, especially for the user that is on the water.

Furthermore, there is no general system accompanying the timer and/or stopwatch to input data of the different watersport criteria completed.

Applicant has developed systems and methods detailed herein to efficiently improve and enhance water-based activities with customizable timers.

BRIEF SUMMARY OF THE INVENTION

Example embodiments of the present disclosure provide devices, systems and associated methods for operating a marine electronic device having a customizable timer for use in marine based activities. As noted above, many marine based activities involve multiple users and require the need for time management. This requirement tends to cause chaos on the watercraft as there is generally a need for multiple timers for the multiple users and a lack of data gathering associated with the use of the timers. In some embodiments, a marine electronic device having a customizable timer is presented that may advantageously minimize the chaos during marine based activities while being able to function as a timer for one or more users, include preparation time for the one or more users, and/or gather data regarding the marine based activity.

An example embodiment includes a marine electronic device for a watercraft, the marine electronic device including a user interface comprising a screen, a processor in communication with the screen, and a memory including computer executable instructions. The computer executable instructions are configured to, when executed by the processor, cause the marine electronic device to cause presentation of a timer on the screen, receive, via the user interface, a user input defining one or more users and a total amount of time for a marine-based activity, and determine, based on the user input, a specified amount of time to be assigned to each of the one or more users based on a total number of the one or more users and the total amount of time. The computer executable instructions are further configured to, when executed by the processor, cause the marine electronic device to assign the specified amount of time to the each of the one or more users, display an indication of the specified amount of time within the timer for each of the one or more users, and operate at least one of the marine electronic device or one or more other systems to provide a notification when the specified amount of time of a current user from the one or more users ends.

In an example embodiment of the marine electronic device, the marine electronic device is configured to cause operation of the at least one of the marine electronic device or the one or more other systems to provide a notification when the specified amount of time of a next user from the one or more users starts. In some example embodiments of the marine electronic device, the notification is one or more of a visual or audio notification.

In some example embodiments of the marine electronic device, the marine electronic device is configured to determine a specified amount of preparation time for the each of the one or more users, and incorporate the specified amount of preparation time for the each of the one or more users into the indication of the specified amount of time within the timer.

In an example embodiment of the marine electronic device, the marine electronic device is further configured to cause operation of the at least one of the marine electronic device or the one or more other systems to provide a notification when the specified amount of preparation time for the next user from the one or more users starts.

In an example embodiment of the marine electronic device, the marine electronic device is further configured to receive data corresponding to the marine-based activity, associate in memory the received data with the current user from one of the one or more users, and store the received data on the memory of the marine electronic device in association with the current user.

In an example embodiment of the marine electronic device, the received data from the marine-based activity includes at least one of time of day, temperature of the water, number of tides, and number of fish caught during the specified amount of time of the one or more users.

In some example embodiments of the marine electronic device, the marine electronic device is further configured to display a representation of the received data gathered during the marine-based activity on the screen at the end of the total amount of time of the marine-based activity.

In an example embodiment of the marine electronic device, the marine electronic device is further configured to display an indication within the timer during the specified amount of time of the current user when the marine electronic device receives data corresponding to a caught fish by the current user.

In some example embodiments of the marine electronic device, the marine electronic device is further configured to receive real time data of a travel path taken by the watercraft during the total amount of time for the marine-based activity, determine the current user during each of the specified amount of time along the travel path, and cause presentation, on the screen, of an indication of the travel path taken by the watercraft on a chart along with an indication of the current user during each segment of the travel path.

In an example embodiment of the marine electronic device, the marine electronic device is further configured to receive data corresponding to a caught fish at a location within the travel path, associate in memory the received data with the current user from one of the one or more users, store the received data on the memory of the marine electronic device in association with the current user, and display an indication on the chart of the caught fish at the location within the travel path associated with the current user.

In another example embodiment, a system for operating a graphical user interface of a marine electronic device of a watercraft is provided including a user interface comprising a screen, a processor in communication with the screen, and a memory including computer executable instructions. The computer executable instructions are configured to, when executed by the processor, cause the marine electronic device to cause presentation of a timer on the screen, receive, via the user interface, a user input defining one or more users and a total amount of time for a marine-based activity, and determine, based on the user input, a specified amount of time to be assigned to each of the one or more users based on a total number of the one or more users and the total amount of time. The marine electronic device is further configured to assign the specified amount of time to the each of the one or more users, display an indication of the specified amount of time within the timer for each of the one or more users, and operate at least one of the marine electronic device or one or more other systems to provide a notification when the specified amount of time of a current user from the one or more users ends or near an end.

In some example embodiments, the marine electronic device is configured to cause operation of the at least one of the marine electronic device or the one or more other systems to provide a notification when the specified amount of time of a next user from the one or more users starts. In an example embodiment, the notification is one or more of a visual or audio notification.

In some example embodiments, the marine electronic device is configured to determine a specified amount of preparation time for the each of the one or more users, and incorporate the specified amount of preparation time for the each of the one or more users into the indication of the specified amount of time within the timer.

In an example embodiment, the marine electronic device is further configured to cause operation of the at least one of the marine electronic device or the one or more other systems to provide a notification when the specified amount of preparation time for the next user from the one or more users starts.

In some example embodiments, the marine electronic device is further configured to receive data corresponding to the marine-based activity, associate in memory the received data with the current user from one of the one or more users, and store the received data on the memory of the marine electronic device in association with the current user.

In an example embodiment, the marine electronic device is further configured to display a representation of the received data gathered during the marine-based activity on the screen at the end of the total amount of time of the marine-based activity.

In some example embodiments, the marine electronic device is further configured to receive real time data of a travel path taken by the watercraft during the total amount of time for the marine-based activity, determine the current user during each of the specified amount of time along the travel path, and cause presentation, on the screen, of an indication of the travel path taken by the watercraft on a chart along with an indication of the current user during each segment of the travel path.

In a further example embodiment, a method is provided for operating a marine electronic device for a watercraft including causing presentation of a timer on a screen, receiving, via a user interface, a user input defining one or more users and a total amount of time for a marine-based activity, and determining, based on the user input, a specified amount of time to be assigned to each of the one or more users based on a total number of the one or more users and the total amount of time. The method also includes assigning the specified amount of time to the each of the one or more users, displaying an indication of the specified amount of time within the timer for each of the one or more users, and operating at least one of the marine electronic device or one or more other systems to provide a notification when the specified amount of time of a current user from the one or more users ends.

BRIEF DESCRIPTION OF THE DRAWINGS

Figure 1:
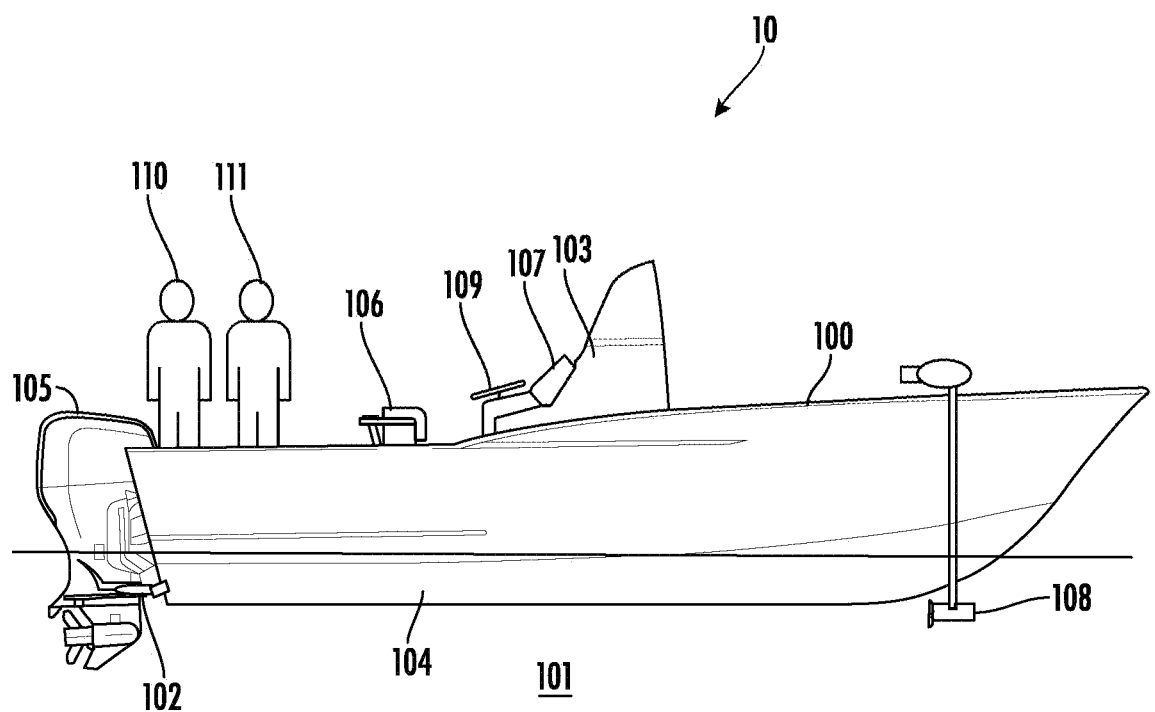
Figure 2:
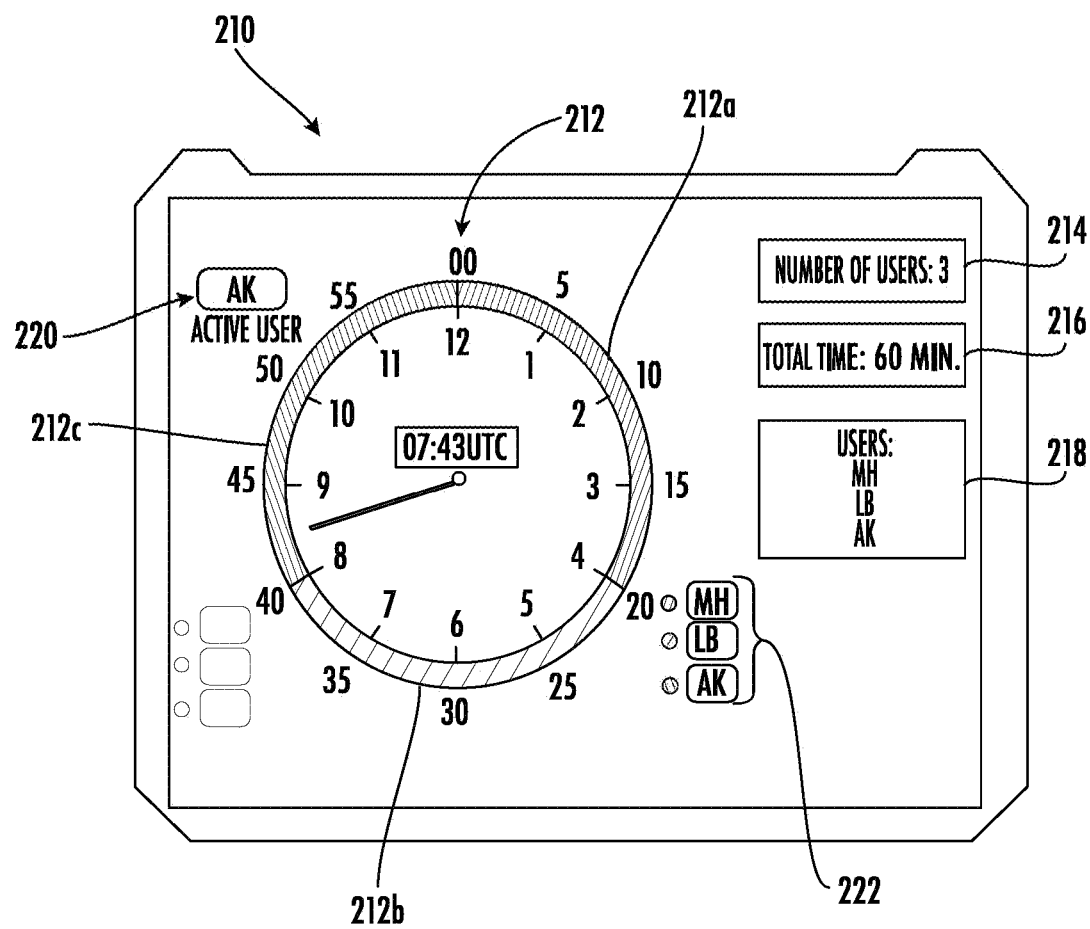
Figure 3:
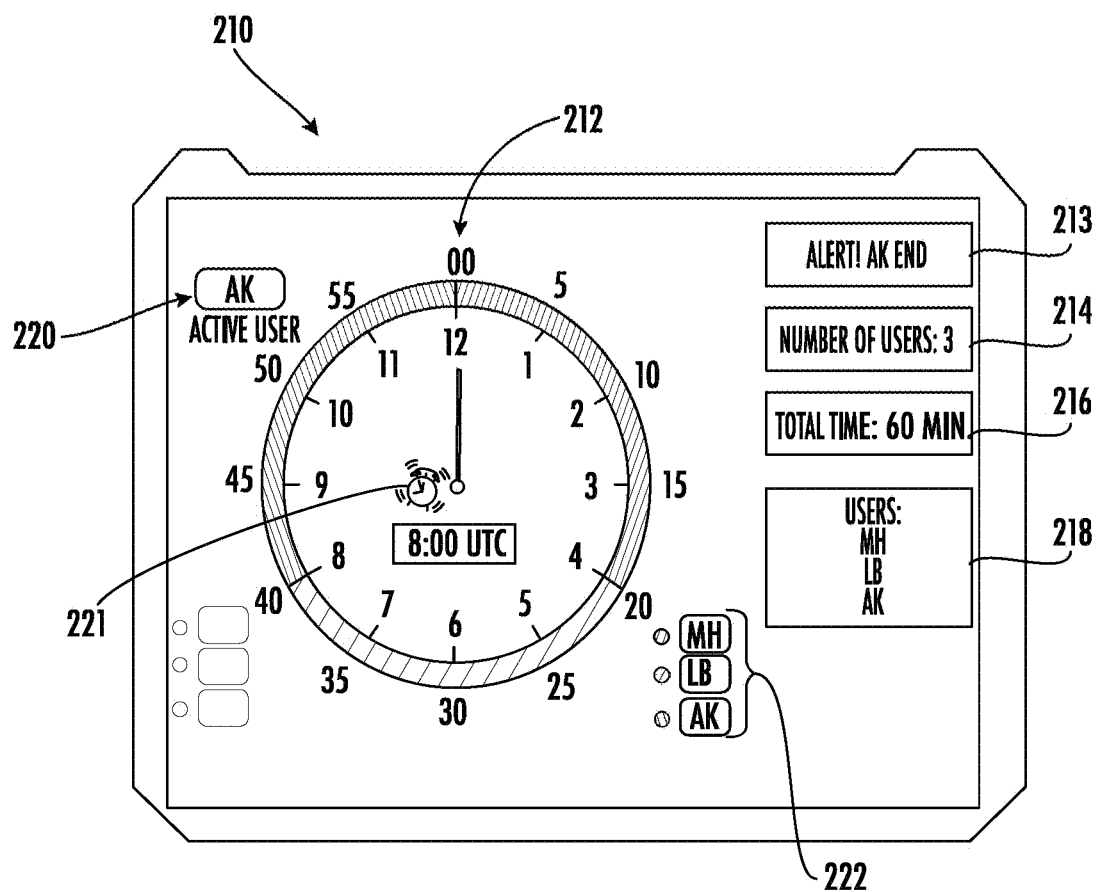
Figure 4:
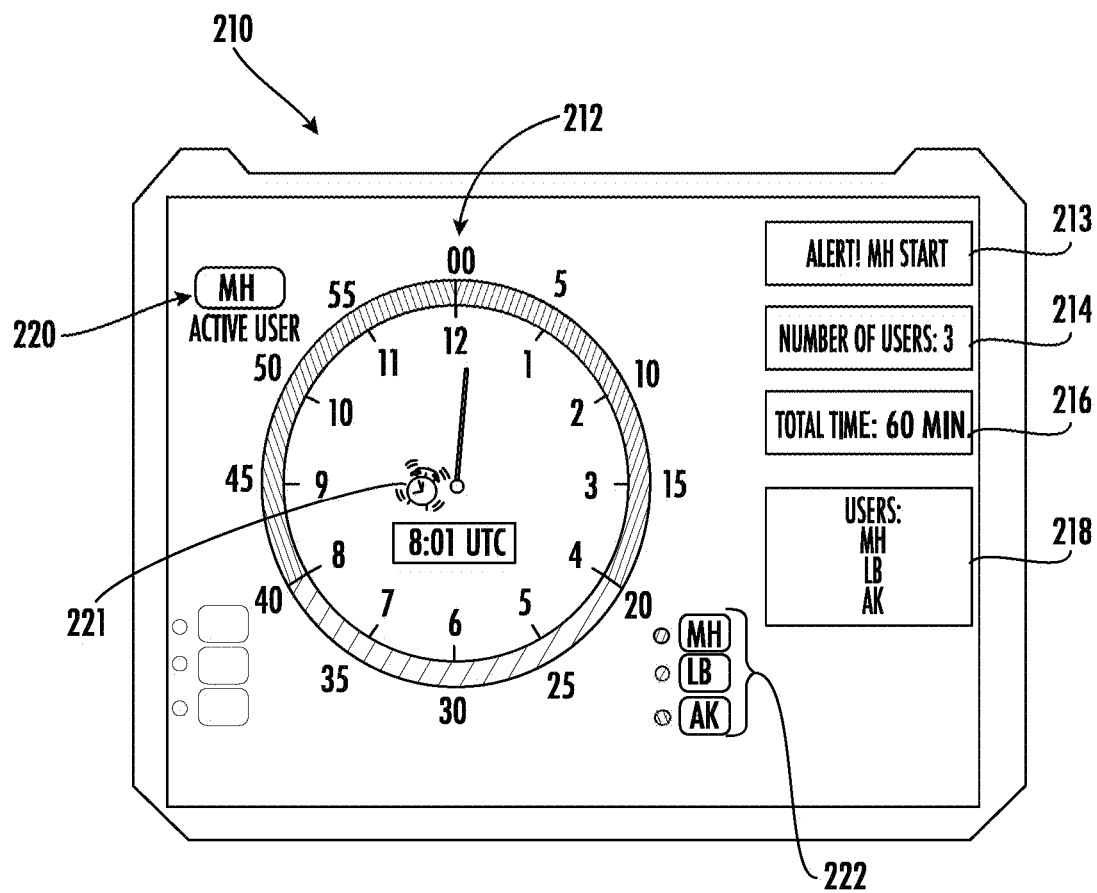
Figure 5:
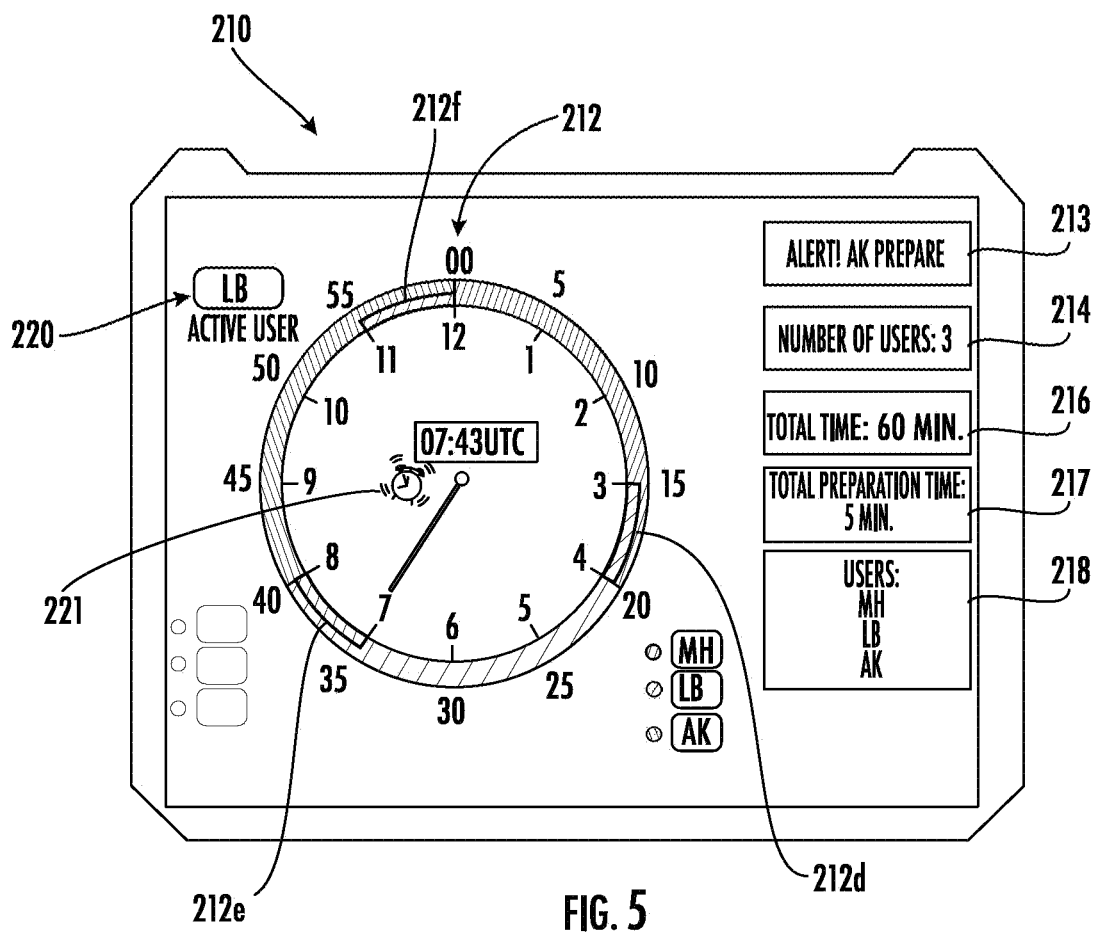
Figure 6:
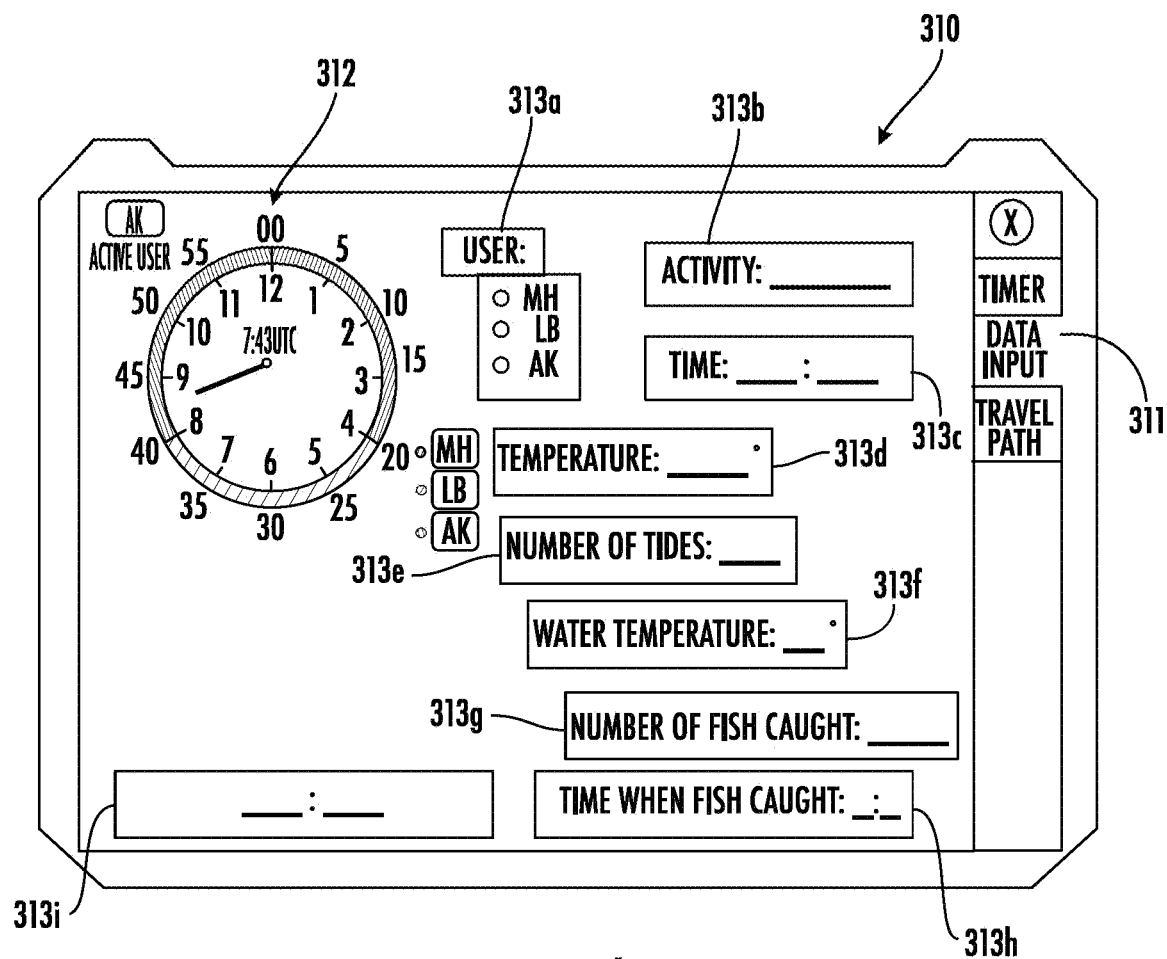
Figure 7:
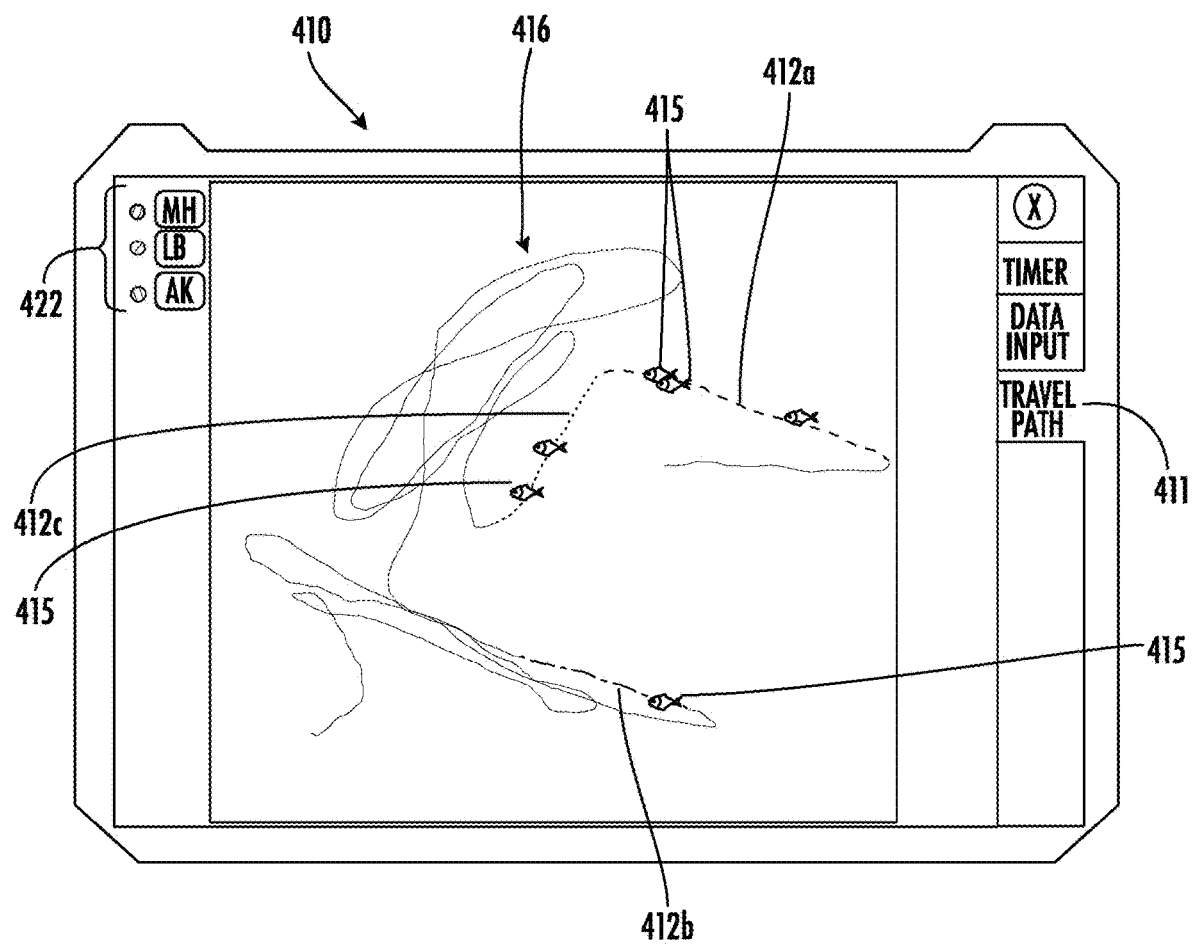
Figure 8:
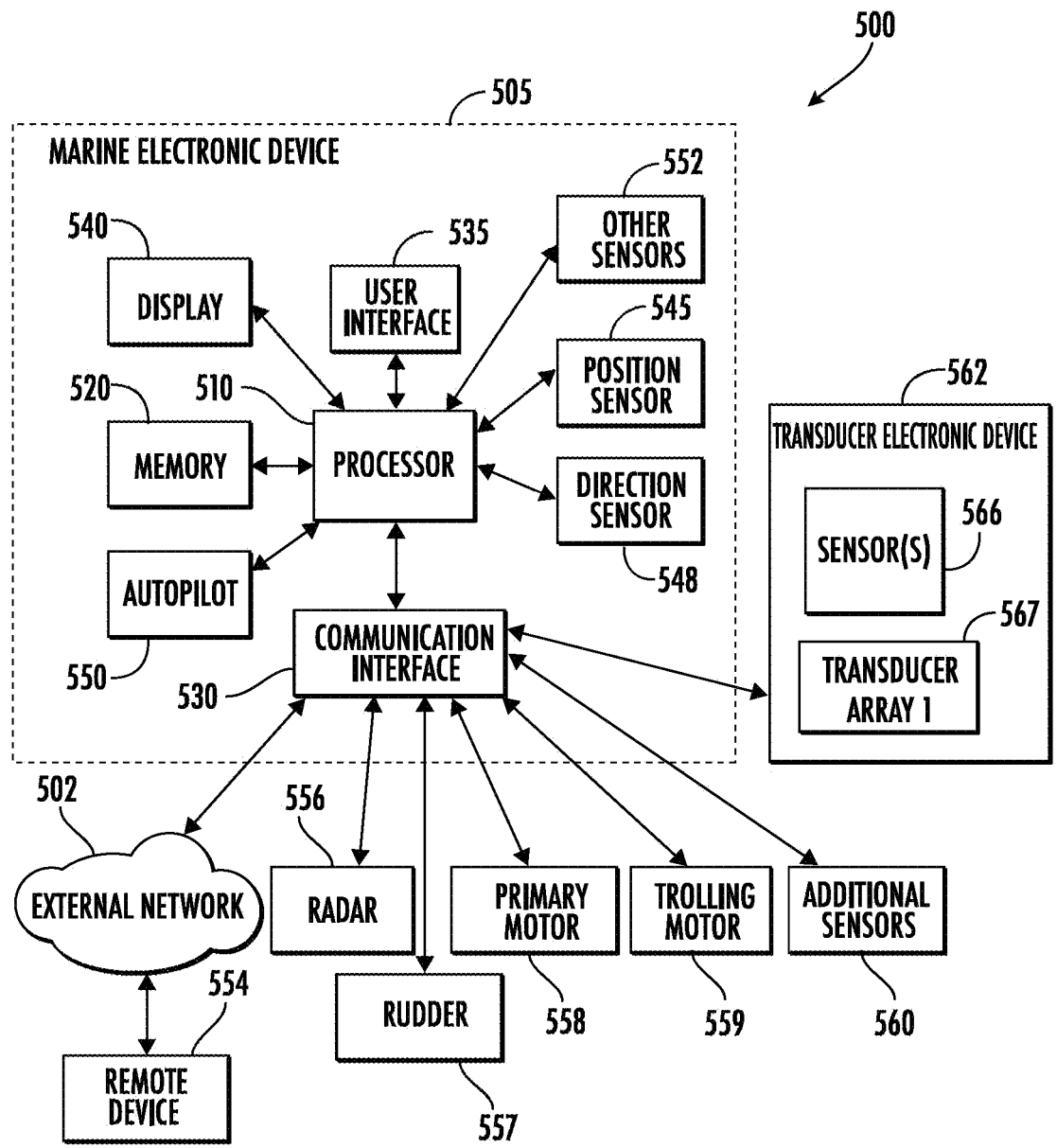
Figure 9:
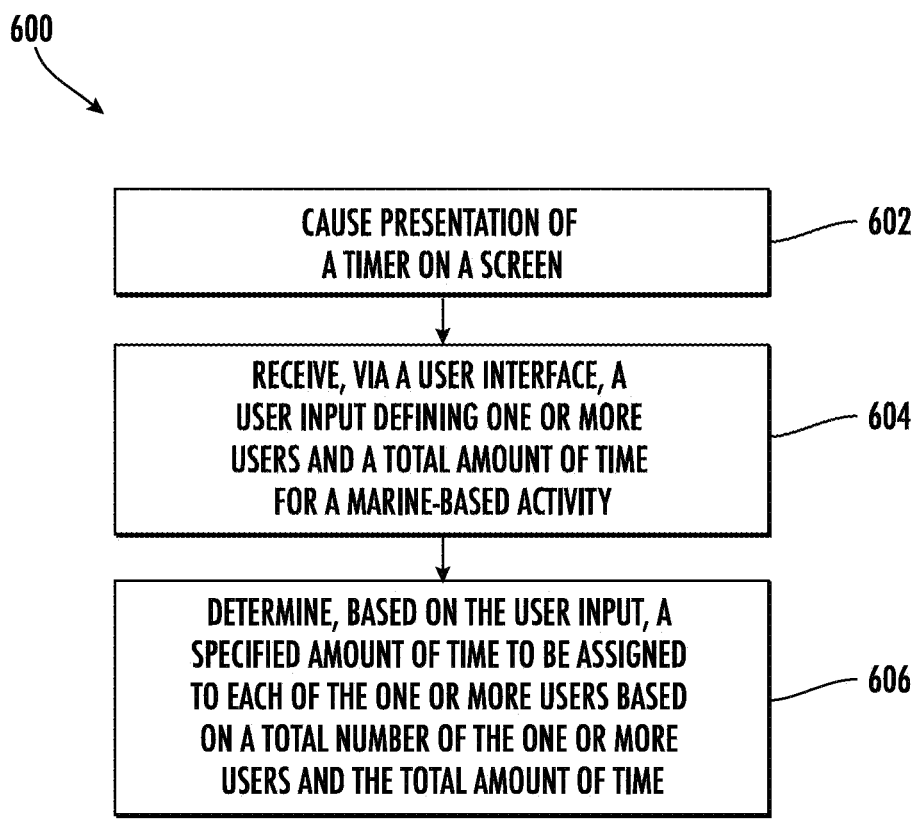
Figure 10:
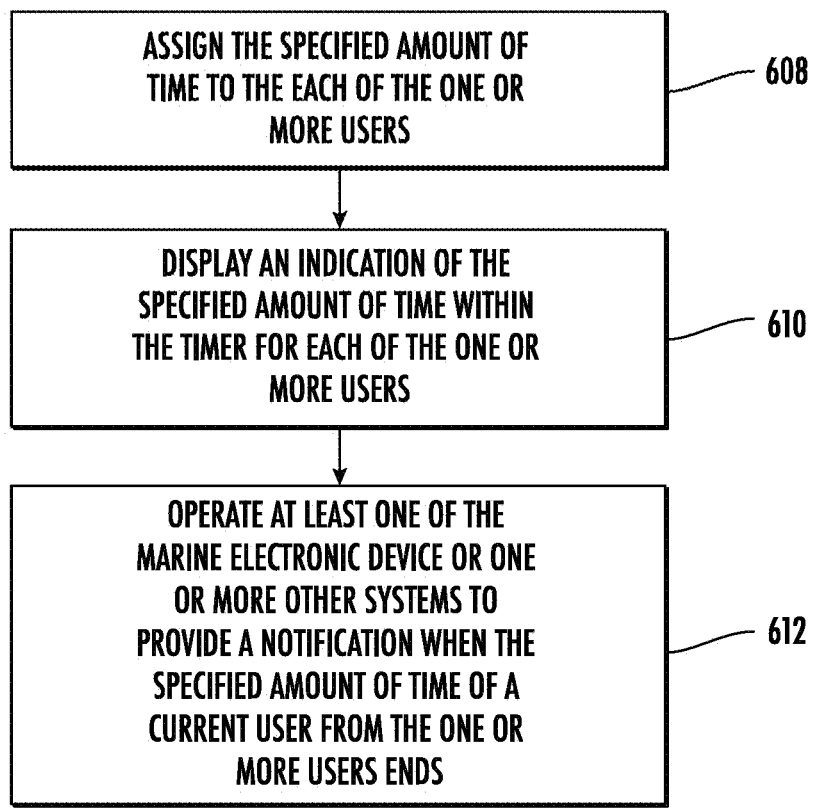

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2 illustrates an example customizable timer having a specified amount of time assigned to one or more users, in accordance with various embodiments discussed herein;

FIGS. 3-4 illustrate example customizable timers notifying when the specified amount of time assigned to the one or more users ends and starts, in accordance with various embodiments discussed herein;

FIG. 5 illustrates an example customizable timer including a specified amount of preparation time for the one or more users, in accordance with various embodiments discussed herein;

FIG. 6 illustrates a user interface receiving data input for a marine based activity, in accordance with some embodiments discussed herein;

FIG. 7 illustrates a user interface including a chart demonstrating a travel path for a marine based activity, in accordance with some embodiments discussed herein;

FIG. 8 illustrates a block diagram of an example system with various electronic devices, marine devices, and secondary devices, in accordance with some embodiments discussed herein; and FIGS. 9-10 illustrate flowcharts of example methods for operating a marine electronic device for a watercraft, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals generally refer to like elements throughout.

FIG. 1 illustrates an example watercraft 100 including various marine devices, in accordance with various embodiments discussed herein. As depicted in FIG. 1, the watercraft 100 is configured to traverse a marine environment, e.g., a body of water 101, with at least one or more users (e.g., a first user 110 and a second user 111) on the watercraft 100. Notably, the watercraft 100 contemplated herein may be a surface watercraft, submersible watercraft, or any other implementation known to those skilled in the art. An example system 10 for operating the watercraft 100 may include a marine electronic device 107 having a display (e.g., multi-function display (MFD)) that is positioned on a console 103 proximate the helm (e.g., steering wheel 109) of the watercraft 100, although other places on the watercraft 100 are contemplated. Likewise, additionally or alternatively, a user's mobile device or a wearable device may include functionality for the marine electronic device 107.

Depending on the configuration, the system 10 may include a sonar system, a navigation system for determining a current location of the watercraft 100, an anchoring system, a radar system and/or one or more other devices. The system 10 may also include a main propulsion motor 105, such as an outboard or inboard motor. Additionally, the system 10 may include a trolling motor 108 configured to propel the watercraft 100 or to maintain a position. Other propulsion methods are also contemplated, such as thrusters, among others. One or more transducer assemblies (e.g., 102) may be mounted in various positions and to various portions of the watercraft 100 and/or equipment associated with the watercraft 100. For example, a transducer assembly may be mounted to the transom of the watercraft 100, such as depicted by transducer assembly 102. Additionally, or alternatively, a transducer assembly may be mounted to the bottom or side of the hull 104 of the watercraft 100 or to the trolling motor 108. In various embodiments, the watercraft 100 may include a gasoline, diesel, or electric inboard motor as part of the propulsion system. The watercraft 100 may use one or more outboard motors, inboard motors, thrusters, jets, pods, trolling motors, or any other type of marine motor or engine for propulsion. The motors may be operated manually or by autopilot units as part of or in communication with the navigation system. An autopilot unit may control the direction and speed of the motor.

The marine electronic device 107 may further include a user interface having a multi-functional display, a processor, a memory, a computer, a marine electronics hub, among others onboard or otherwise associated with the watercraft 100. The marine electronic device 107 may be configured to control operations of one or more marine devices (e.g., sonar system, propulsion system, radar system, the display, timing system, anchoring system, navigation system). The marine electronic device 107 may be in communication with one or more sensor modules, via wired and/or wireless connections. The sensor module may transmit signals to the controller indicating a detected condition, event, and/or a user input. In some embodiments, the controller may be an assembly or system of multiple processors and/or circuitry distributed across various devices. As such, actions taken by the marine electronic device 107 (e.g., determining, transmitting, receiving, generating, comparing) may each occur on different devices or using multiple components.

Many variations of the system 10 are possible. For example, the system 10 may include or be in communication with one or more marine devices. Non-limiting examples of the one or more marine devices include a propulsion system, engine, steering system, gas-powered or electric trolling motor, outboard motor, inboard motor, sonar system, radar system, fish finder, navigation system, global positioning system (GPS), autopilot, plotter, anchor system, lighting, pumps, electrical power system, radio, audio system, digital switching, displays, temperature control system, fuel system, etc.

FIG. 2 illustrates an example customizable timer for a marine based activity having a specified amount of time assigned to one or more users, in accordance with various embodiments discussed herein. The marine electronic device 107 of FIG. 1 includes a user interface 210 having a screen and a processor in communication with the screen. The marine electronic device 210 further includes a memory having computer executable instructions, the computer executable instructions configured, when executed by the processor, to cause the marine electronic device to cause presentation of a timer 212 on the screen. The marine electronic device 210 may further receive, via the user interface 210, a user input defining one or more users and a total amount of time for a marine-based activity.

As illustrated in FIG. 2, the user interface 210 may include a variety of fields, which may be edited by a user, defining different information to be incorporated into the timer 212. As illustrated, the user may enter the total number of the one or more users for the marine based activity as shown in field 214 of the user interface 210. Furthermore, as depicted in box 216 on the user interface 210, the user may input the total amount of time that is required for the marine based activity (e.g., 30 minutes, 60 minutes, 120 minutes). In some embodiments, the marine-based activity may include, but is not limited to, commercial or personal fishing, wakeboarding, waterskiing, snorkeling, scuba diving, among others. In certain embodiments, the number of users 214 and/or the total amount of time for the marine based activity 216 may be edited by the user at any time during the water-based activity. In other embodiments, the number of users 214 and/or the total time 216 may be edited by the user after the timer has ended.

Based on the user input, the marine electronic device may then determine a specified amount of time to be assigned to each of the one or more users, such as based on a total number of the one or more users and the total amount of time. In some embodiments, the user may define the specified amount of time to be assigned to each of the one or more users. The marine electronic device then assigns the specified amount of time to the each of the one or more users, such as in memory and/or via the display. For example, as illustrated in FIG. 2, the user input for the total number of the one or more users 214 may be three users and the total amount of time 216 for the marine based activity may be 60 minutes. Thus, in some embodiments, the marine electronic device determines, based on the user input in the number of users field 216 and the total amount of time field 216, that the specified amount of time to be assigned to each of the one or more users is 20 minutes and then assigns 20 minutes to each of the one or more users.

In some embodiments, the computer executable instructions are configured, when executed by the processor, to cause the marine electronic device to display an indication (e.g., 212a, 212b, 212c) of the specified amount of time within the timer 212 for each of the one or more users. Thus, the timer 212 includes a segment for each of the one or more users. As illustrated in FIG. 2, the timer 212 includes three segments corresponding to each of the three users, corresponding to the user input in field 214. The segments within the timer 212 are divided on a 60-minute timer with 20 minutes allocated to each segment corresponding to the user input in field 216. In certain embodiments, the marine electronic device may also receive, via user input, the names and/or initials of the one or more users, as shown in field 218 of the user interface 210. In various embodiments, the names of the one or more users in field 218 may include any naming convention desired. In some embodiments, the number of user initials to be entered via the user interface 210 is generated from the total number of users of the one or more users of field 214. This function allows the initials of the one or more users to coincide with the indication 212a, 212b, 212c of the specified amount of time within the timer 212 for each of the one or more users.

In some embodiments, the timer 212 may further include a user indication field 222 assigning a color and/or pattern to each of the users in field 218. As shown by the user indication field 222 of the timer 212, segment 212a corresponds with the user "MH", segment 212b corresponds with the user "LB", and segment 212c corresponds with the user "AK." Thus, following the above example, the timer 212 on the user interface 210 may include three segments 212a, 212b, 212c each corresponding to the three users with each segment 212a, 212b, 212c representing 20 minutes on a 60-minute timer. Accordingly, each of the three users (e.g., MH, LB, and AK) have 20 minutes to perform the desired marine based activity.

In some embodiments, the marine electronic device may include an active user field 220 within the timer 212 depicting the active user from the one or more users. The active user is the user that is presently engaging with the marine-based activity. In one embodiment, the active user may be the angler presently on the fishing rod. In another embodiment, the active user may be the person or persons presently on the water for the water-based activity. In some embodiments, the timer 212 may also display the time of day which is incorporated within the timer 212. Additionally, while the timer 212 in FIG. 2 is presented on the user interface 210 on the marine electronic device, the timer 212 may also be presented on other displays throughout the watercraft, a user's mobile device and/or a wearable device which includes functionality for the marine electronic device.

FIGS. 3-4 illustrate example customizable timers notifying when the specified amount of time assigned to the one or more users ends and starts, in accordance with various embodiments discussed herein. As illustrated in the user interface 210 of FIG. 3, the computer executable instructions is further configured, when executed by the processor, to cause the marine electronic device to operate at least one of the marine electronic device or one or more other systems discussed above to provide a notification 213, 221 when the specified amount of time of the current user from the one or more users ends. In some embodiments, the notification is one or more of a visual or audio notification. Thus, as shown in FIG. 3 and following the example of FIG. 2, once the 20-minute timer for AK ends, the timer 212 provides a visual notification 213 on the user interface 210 and/or an audio notification 221 within the timer 212. This notification effectively allows the one or more users on the watercraft to know when the specified time of the active user ends without creating any confusion on when a user from the one or more users time ends.

Furthermore, in some embodiments, as illustrated by the user interface 210 of FIG. 4, the marine electronic device is further configured to cause operation of the at least one of the marine electronic device or the one or more other systems to provide a notification 213, 221 when the specified amount of time of a next user from the one or more users starts. In some embodiments, the notification is one or more of a visual or audio notification. Thus, as shown in FIG. 4 and following the example above, once the 20-minute timer for AK ends, the timer 212 will provide an audio notification 221 and/or a visual notification 213 on the user interface indicating the time of the next user, in this case MH, has begun. In some embodiments, once the total amount of time 216 of the timer 212 ends, the timer may restart again using the same number of one or more users and the same total amount of time previously entered by the user.

FIG. 5 illustrates an example customizable timer including a specified amount of preparation time for the one or more users, in accordance with various embodiments discussed herein. In some embodiments, the marine electronic device is configured to determine a specified amount of preparation time 217 for the each of the one or more users and incorporate the specified amount of preparation time 217 for the each of the one or more users into the indication of the specified amount of time within the timer 212. In some embodiments, the marine electronic device may receive, via the user interface 210, a user input defining the amount of preparation time 217 for the one or more users and the total amount of preparation time 217 may then be assigned to each of the one or more users. In other embodiments, the user may allocate the total amount of preparation time 217 to a specific number of the one or more users without assigning the total amount of preparation time to all of the one or more users. As shown in FIG. 5, based on the user input on the user interface 210 in the total number of users field 214 and the total amount of preparation time field 217, the marine electronic device may assign 5 minutes of preparation time to each of the three users. The marine electronic device may also incorporate the total amount of preparation time within the timer 212. In some embodiments, the preparation time is for the next user from the one or more users and not the active user 220. Furthermore, in certain embodiments, the indication for preparation time 212d, 212e, 212f for each of the one or more users within the timer 212 overlaps with the indication of the specified amount of time of the current user 212a, 212b, 212c within the timer 212. Thus, in certain embodiments, the total amount of preparation time of the next user is the same amount of time as the remaining time of the current user 220 within the time.

The marine electronic device may be further configured to cause operation of the at least one of the marine electronic device or the one or more other systems to provide a notification when the specified amount of preparation time for the next user from the one or more users starts. In some embodiments, the notification is one or more of a visual or audio notification. Thus, for example, as shown in FIG. 5, during the specified amount of time for the user "LB" when the 5-minute preparation time for "AK" begins, the user interface notifies the user by providing an audio notification 221 and/or a visual notification 213 on the user interface 210. Furthermore, in some embodiments, the marine electronic device may further be configured to display an indication within the timer during the specified amount of time of the current user when the marine electronic device receives data corresponding to a caught fish by the current user. During commercial or personal fishing, this function of the marine electronic device allows the one or more users on the watercraft to effectively become aware when a fish is caught by the active user and how to proceed accordingly. In this regard, it may be desirable to perform any number of specific tasks to aid in the fish catching process (e.g., adjust speed and/or direction of the watercraft, physically aid the angler on the rod, etc.) and/or aid in the after effects of the fish catching process (e.g., start a livewell pump, get a new bait ready, etc.).

FIG. 6 illustrates a user interface receiving data input 311 for a marine based activity, in accordance with some embodiments discussed herein. The marine electronic device of FIGS. 1-2 includes a memory having computer executable instructions, the computer executable instructions configured, when executed by the processor, to cause the marine electronic device to receive data corresponding to the marine-based activity, associate in memory the received data with the current user from one of the one or more users, and store the received data on the memory of the marine electronic device in association with the current user. In the illustrated embodiment, the received data presented in the user interface 310 includes at least one of time of day 313c, temperature of the water 313f, number of tides 313e, and number of fish caught 313g during the specified amount of time of the one or more users. On the user interface 310 data input section 311, a user may select various data in connection with the marine based activity being conducted. The user may select a specific user from the one or more users active on the timer in field 313a. The user may also enter the marine based activity being performed in field 313b on the user interface 310. In some embodiments, when a certain marine based activity is entered or selected from a list of marine based activities, the marine electronic device may generate an auto generated list of fields consisting of data to be entered by the user. For example, angling may include the input of data like the total number of fish caught 313g by the selected user and the time of day each fish was caught 313h, while wakeboarding may include the input of data like the number of wipeouts, the longest amount time on the wakeboard, among others. In some embodiments, as shown in FIG. 6, the running timer 312 may also be display on the user interface 310 as the user is entering data for the marine based activity. In certain embodiments, the user interface 310 may also include a blank field 313i in which a user can enter any desired data from the marine based activity. Furthermore, in some embodiments, the marine electronic device may be further configured to display a representation of the received data gathered during the marine-based activity on the screen at the end of the total amount of time of the marine-based activity. Notably, while the above example includes gathering the information manually (e.g., via user entry), in some embodiments, some or all of the information can be gathered automatically, such as from one or more systems (e.g., server(s), sonar, marine electronic device, radar, trolling motor, etc.).

FIG. 7 illustrates a user interface 410 including a chart demonstrating a travel path for a marine based activity, in accordance with some embodiments discussed herein. The marine electronic device of FIGS. 1-6 includes a memory having computer executable instructions, the computer executable instructions configured, when executed by the processor, to cause the marine electronic device to receive real time data of a travel path taken by the watercraft during the total amount of time for the marine-based activity and determine/correlate the real time data to the current user during each of the specified amount of time along the travel path. Accordingly, in some embodiments, the marine electronic device may cause presentation, on the screen, of an indication of the travel path 416 taken by the watercraft on a chart along with an indication of the current user during each segment of the travel path 412a, 412b, 412c. In some embodiments, the user indication field of FIGS. 2-6 may be used to demonstrate the indication of the current user during each segment of the travel path 412a, 412b, 412c. Thus, for example, segment 412a of the travel path is the segment of the travel path taken by the watercraft that the user "MH" was the active user during the marine based activity, segment 412b of the travel path is the segment of the travel path taken by the watercraft that the user "LB" was the active user during the marine based activity and segment 412c of the travel path is the segment of the travel path taken by the watercraft that the user "AK" was the active user during the marine based activity.

Additionally, in some embodiments, the marine electronic device may be configured to receive data corresponding to various activities or circumstances corresponding to the marine-based activity, determine the location and/or time associated with that activity or circumstance and cause corresponding display of an indication of the activity or circumstance on the present trial at the appropriate position. Some example activities or circumstances include, for example, catching a fish, identifying a fishing spot (e.g., temperature break, structure under the water, etc.), noting a fish bite, noting a school of fish from the sonar, among many other things. For example, a caught fish at a location within the travel path may be associated in memory and presented on the display accordingly. For example, an indication of a caught fish 415 may be presented at the location within the travel path associated with the current user or past user as appropriate. In certain embodiments, the travel path section 411 can include other information regarding the marine based activity including the start and end time of the travel path taken by the watercraft, the start and end of each of the one or more users as the active users, among other information.

Example System Architecture

FIG. 8 illustrates a block diagram of an example system 500 of various embodiments of the present invention described herein. This advantageously provides for the use of a wide variety of inputs, and these inputs may be utilized to receive data that may be used to assist in various functionality as described herein.

The illustrated system 500 includes a marine electronic device 505. The system 500 may comprise numerous marine devices. As shown in FIG. 8, a transducer assembly 562, a radar 556, a rudder 557, a primary motor 558, a trolling motor 559, and additional sensors/devices 560 may be provided as marine devices, but other marine devices may also be provided. One or more marine devices may be implemented on the marine electronic device 505 as well. For example, a position sensor 545, a direction sensor 548, an autopilot 550, and other sensors 552 may be provided within the marine electronic device 505. These marine devices can be integrated within the marine electronic device 505, integrated on a watercraft at another location and connected to the marine electronic device 505, and/or the marine devices may be implemented at a remote device 554 in some embodiments. The system 500 may include any number of different systems, modules, or components; each of which may comprise any device or means embodied in either hardware, software, or a combination of hardware and software configured to perform one or more corresponding functions described herein.

The marine electronic device 505 may include at least one processor 510, a memory 520, a communication interface 530, a user interface 535, a display 540, autopilot 550, and one or more sensors (e.g., position sensor 545, direction sensor 548, and other sensors 552). One or more of the components of the marine electronic device 505 may be located within a housing or could be separated into multiple different housings (e.g., be remotely located).

The at least one processor 510 may be any means configured to execute various programmed operations or instructions stored in a memory device (e.g., memory 520) such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 510 as described herein.

In some embodiments, the at least one processor 510 may be further configured to implement signal processing. In some embodiments, the at least one processor 510 may be configured to perform enhancement features to improve the display characteristics of data or images, collect or process additional data, such as time, temperature, GPS information, waypoint designations, or others, or may filter extraneous data to better analyze the collected data. The at least one processor 510 may further implement notices and alarms, such as those determined or adjusted by a user, to reflect proximity of other vehicles (e.g., watercraft), approaching storms, etc.

In an example embodiment, the memory 520 may include one or more non-transitory storage or memory devices such as, for example, volatile and/or non-volatile memory that may be either fixed or removable. The memory 520 may be configured to store instructions, computer program code, radar data, and additional data such as sonar data, chart data, location/position data in a non-transitory computer readable medium for use, such as by the at least one processor 510 for enabling the marine electronic device 505 to carry out various functions in accordance with example embodiments of the present invention. For example, the memory 520 could be configured to buffer input data for processing by the at least one processor 510. Additionally, or alternatively, the memory 520 could be configured to store instructions for execution by the at least one processor 510.

The communication interface 530 may be configured to enable communication to external systems (e.g., an external network 502). In this manner, the marine electronic device 505 may retrieve stored data from a remote device 554 via the external network 502 in addition to or as an alternative to the onboard memory 520. Additionally, or alternatively, the marine electronic device 505 may transmit or receive data. In some embodiments, the marine electronic device 505 may also be configured to communicate with other devices or systems (such as through the external network 502 or through other communication networks, such as described herein). For example, the marine electronic device 505 may communicate with a propulsion system of the watercraft (e.g., for autopilot control); a remote device (e.g., a user's mobile device, a handheld remote, etc.); or another system.

The communications interface 530 of the marine electronic device 505 may also include one or more communications modules configured to communicate with one another in any of a number of different manners including, for example, via a network. In this regard, the communications interface 530 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 500.

The position sensor 545 may be configured to determine the current position and/or location of the marine electronic device 505 (and/or the watercraft 100). For example, the position sensor 545 may comprise a GPS, bottom contour, inertial navigation system, such as machined electromagnetic sensor (MEMS), a ring laser gyroscope, or other location detection system. Alternatively, or in addition to determining the location of the marine electronic device 505 or the watercraft, the position sensor 545 may also be configured to determine the position and/or orientation of an object outside of the watercraft.

The display 540 (e.g., one or more screens) may be configured to present images and may include or otherwise be in communication with a user interface 535 configured to receive input from a user. The display 540 may be, for example, a conventional LCD (liquid crystal display), a touch screen display, mobile device, or any other suitable display known in the art upon which images may be displayed.

In some embodiments, the display 540 may present one or more sets of data (or images generated from the one or more sets of data). Such data includes chart data, radar data, sonar data, weather data, location data, position data, orientation data, sonar data, or any other type of information relevant to the watercraft. Radar data may be received from radar 556 or from radar devices positioned at other locations, such as remote from the watercraft. Additional data may be received from marine devices such as a sonar transducer assembly 562, a primary motor 558 or an associated sensor, a trolling motor 559 or an associated sensor, an autopilot 550, a rudder 557 or an associated sensor, a position sensor 545, a direction sensor 548, other sensors 552, a remote device 554, onboard memory 520 (e.g., stored chart data, historical data, etc.), or other devices.

In some further embodiments, various sets of data, referred to above, may be superimposed or overlaid onto one another. For example, a route may be applied to (or overlaid onto) a chart (e.g., a map or navigational chart). Additionally, or alternatively, depth information, weather information, radar information, sonar information, or any other navigation system inputs may be applied to one another.

The user interface 535 may include, for example, a keyboard, keypad, function keys, mouse, scrolling device, input/output ports, touch screen, or any other mechanism by which a user may interface with the system.

Although the display 540 of FIG. 8 is shown as being directly connected to the at least one processor 510 and within the marine electronic device 505, the display 540 could alternatively be remote from the at least one processor 510 and/or marine electronic device 505. Likewise, in some embodiments, the position sensor 545 and/or user interface 535 could be remote from the marine electronic device 505.

The marine electronic device 505 may include one or more other sensors/devices 552, such as configured to measure or sense various other conditions. The other sensors/devices 552 may include, for example, an air temperature sensor, a water temperature sensor, a current sensor, a light sensor, a wind sensor, a speed sensor, or the like.

The transducer assembly 562 illustrated in FIG. 8 includes one transducer array 567. In some embodiments, more transducer arrays could be included, or other transducer elements could be included. As indicated herein, the transducer assembly 562 may also include a sonar signal processor or other processor (although not shown) configured to perform various sonar processing. In some embodiments, the processor (e.g., at least one processor 510 in the marine electronic device 505, a controller (or processor portion) in the transducer assembly 562, or a remote controller—or combinations thereof) may be configured to filter sonar return data and/or selectively control transducer elements of the transducer array 567. For example, various processing devices (e.g., a multiplexer, a spectrum analyzer, A-to-D converter, etc.) may be utilized in controlling or filtering sonar return data and/or transmission of sonar signals from the transducer array 567.

The transducer assembly 562 may also include one or more other systems, such as various sensor(s) 566. For example, the transducer assembly 562 may include an orientation sensor, such as gyroscope or other orientation sensor (e.g., accelerometer, MEMS, etc.) that can be configured to determine the relative orientation of the transducer assembly 562 and/or the one or more arrays 567—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 8 may be rearranged to alter the connections between components. For example, in some embodiments, a marine device outside of the marine electronic device 505, such as the radar 556, may be directly connected to the at least one processor 510 rather than being connected to the communication interface 530. Additionally, sensors and devices implemented within the marine electronic device 505 may be directly connected to the communications interface in some embodiments rather than being directly connected to the at least one processor 510.

Example Flowchart(s) and Operations

Embodiments of the present invention provide methods for a watercraft including various marine devices having a customizable timer for use in marine based activities. Various examples of the operations performed in accordance with embodiments of the present invention will now be provided with reference to FIGS. 9-10.

FIG. 9-10 illustrate flowcharts according to an example method for a use of a customizable timer for use in marine based activities according to an example embodiment 600. The operations illustrated in and described with respect to FIGS. 9-10 may, for example, be performed by, with the assistance of, and/or under the control of one or more of the processor, memory including computer executable instructions, communication interface, user interface, position sensor, radar, sensor(s), rudder, display, and/or autopilot.

Operation 602 may include causing presentation of a timer on a screen and operation 604 may include receiving, via a user interface, a user input defining one or more users and a total amount of time for a marine-based activity. The method may also include determining, based on the user input, a specified amount of time to be assigned to each of the one or more users based on a total number of the one or more users and the total amount of time at operation 606, and, turning to FIG. 10, assigning the specified amount of time to the each of the one or more users at operation 608. The method may also include displaying an indication of the specified amount of time within the timer for each of the one or more users at operation 610 and operating at least one of the marine electronic device or one or more other systems to provide a notification when the specified amount of time of a current user from the one or more users ends at operation 612.

While various methods have been described herein, additional steps may be performed, and/or the described methods may be combined together. Further, unless otherwise indicated, the operations described in the embodiments may be performed in different orders or certain operations may be performed simultaneously.

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed:

1. A marine electronic device for a watercraft, the marine electronic device comprising:
    a user interface comprising a screen;
    a processor in communication with the screen;
    a memory including computer executable instructions, the computer executable instructions configured to, when executed by the processor, cause the marine electronic device to:
        cause presentation of a timer on the screen;
        receive, via the user interface, a user input defining one or more users and a total amount of time for a marine-based activity;
        determine, based on the user input, a specified amount of time to be assigned to each of the one or more users based on a total number of the one or more users and the total amount of time;
        assign the specified amount of time to the each of the one or more users;
        display an indication of the specified amount of time within the timer for each of the one or more users; and
        operate at least one of the marine electronic device or one or more other systems to provide a notification when the specified amount of time of a current user from the one or more users ends.

2. The marine electronic device of claim 1, wherein the marine electronic device is configured to cause operation of the at least one of the marine electronic device or the one or more other systems to provide a notification when the specified amount of time of a next user from the one or more users starts.

3. The marine electronic device of claim 1, wherein the notification is one or more of a visual or audio notification.

4. The marine electronic device of claim 1, wherein the marine electronic device is configured to:
    determine a specified amount of preparation time for the each of the one or more users; and
    incorporate the specified amount of preparation time for the each of the one or more users into the indication of the specified amount of time within the timer.

5. The marine electronic device of claim 4, wherein the marine electronic device is further configured to cause operation of the at least one of the marine electronic device or the one or more other systems to provide a notification when the specified amount of preparation time for the next user from the one or more users starts.

6. The marine electronic device of claim 1, wherein the marine electronic device is further configured to:

receive data corresponding to the marine-based activity;
associate in memory the received data with the current user from one of the one or more users; and
store the received data on the memory of the marine electronic device in association with the current user.

7. The marine electronic device of claim 6, wherein the received data from the marine-based activity includes at least one of time of day, temperature of the water, number of tides, and number of fish caught during the specified amount of time of the one or more users.

8. The marine electronic device of claim 6, wherein the marine electronic device is further configured to display a representation of the received data gathered during the marine-based activity on the screen at the end of the total amount of time of the marine-based activity.

9. The marine electronic device of claim 6, wherein the marine electronic device is further configured to display an indication within the timer during the specified amount of time of the current user when the marine electronic device receives data corresponding to a caught fish by the current user.

10. The marine electronic device of claim 1, wherein the marine electronic device is further configured to:
receive real time data of a travel path taken by the watercraft during the total amount of time for the marine-based activity;
determine the current user during each of the specified amount of time along the travel path; and
cause presentation, on the screen, of an indication of the travel path taken by the watercraft on a chart along with an indication of the current user during each segment of the travel path.

11. The marine electronic device of claim 10, wherein the marine electronic device is further configured to:
receive data corresponding to a caught fish at a location within the travel path;
associate in memory the received data with the current user from one of the one or more users;
store the received data on the memory of the marine electronic device in association with the current user; and
display an indication on the chart of the caught fish at the location within the travel path associated with the current user.

12. A system for operating a graphical user interface of a marine electronic device of a watercraft, the system comprising:
a user interface comprising a screen;
a processor in communication with the screen;
a memory including computer executable instructions, the computer executable instructions configured to, when executed by the processor, cause the marine electronic device to:
cause presentation of a timer on the screen;
receive, via the user interface, a user input defining one or more users and a total amount of time for a marine-based activity;
determine, based on the user input, a specified amount of time to be assigned to each of the one or more users based on a total number of the one or more users and the total amount of time;
assign the specified amount of time to the each of the one or more users;
display an indication of the specified amount of time within the timer for each of the one or more users; and
operate at least one of the marine electronic device or one or more other systems to provide a notification when the specified amount of time of a current user from the one or more users ends or near an end.

13. The system of claim 12, wherein the marine electronic device is configured to cause operation of the at least one of the marine electronic device or the one or more other systems to provide a notification when the specified amount of time of a next user from the one or more users starts.

14. The system of claim 12, wherein the notification is one or more of a visual or audio notification.

15. The system of claim 12, wherein the marine electronic device is configured to:
determine a specified amount of preparation time for the each of the one or more users; and
incorporate the specified amount of preparation time for the each of the one or more users into the indication of the specified amount of time within the timer.

16. The system of claim 15, wherein the marine electronic device is further configured to cause operation of the at least one of the marine electronic device or the one or more other systems to provide a notification when the specified amount of preparation time for the next user from the one or more users starts.

17. The system of claim 12, wherein the marine electronic device is further configured to:
receive data corresponding to the marine-based activity;
associate in memory the received data with the current user from one of the one or more users; and
store the received data on the memory of the marine electronic device in association with the current user.

18. The system of claim 17, wherein the marine electronic device is further configured to display a representation of the received data gathered during the marine-based activity on the screen at the end of the total amount of time of the marine-based activity.

19. The system of claim 12, wherein the marine electronic device is further configured to:
receive real time data of a travel path taken by the watercraft during the total amount of time for the marine-based activity;
determine the current user during each of the specified amount of time along the travel path; and
cause presentation, on the screen, of an indication of the travel path taken by the watercraft on a chart along with an indication of the current user during each segment of the travel path.

20. A method for operating a marine electronic device for a watercraft, the method comprising:
causing presentation of a timer on a screen;
receiving, via a user interface, a user input defining one or more users and a total amount of time for a marine-based activity;
determining, based on the user input, a specified amount of time to be assigned to each of the one or more users based on a total number of the one or more users and the total amount of time;
assigning the specified amount of time to the each of the one or more users;
displaying an indication of the specified amount of time within the timer for each of the one or more users; and
operating at least one of the marine electronic device or one or more other systems to provide a notification when the specified amount of time of a current user from the one or more users ends.

* * * * *